(12) United States Patent
Arpirez Vega et al.

(10) Patent No.: US 11,234,048 B2
(45) Date of Patent: Jan. 25, 2022

(54) DETERMINATION OF QOE IN ENCRYPTED VIDEO STREAMS USING SUPERVISED LEARNING

(71) Applicant: Zhilabs S.L., Barcelona (ES)

(72) Inventors: Julio César Arpirez Vega, Barcelona (ES); Sergi Zapater Cano, Barcelona (ES); Joan Raventós Simón, Barcelona (ES)

(73) Assignee: Zhilabs S.L., Barcelona (ES)

( * ) Notice: Subject to any disclaimer, the term of this patent is extended or adjusted under 35 U.S.C. 154(b) by 162 days.

(21) Appl. No.: 16/049,947

(22) Filed: Jul. 31, 2018

(65) Prior Publication Data

US 2019/0037270 A1    Jan. 31, 2019

(30) Foreign Application Priority Data

Jul. 31, 2017  (EP) .................................... 17382523

(51) Int. Cl.
*H04N 21/2347* (2011.01)
*H04N 21/466* (2011.01)
(Continued)

(52) U.S. Cl.
CPC ... *H04N 21/44008* (2013.01); *G06K 9/00718* (2013.01); *G06K 9/6256* (2013.01); *G06K 9/6262* (2013.01); *H04L 41/509* (2013.01); *H04L 41/5067* (2013.01); *H04L 65/4076* (2013.01); *H04L 65/80* (2013.01); *H04N 17/004* (2013.01); *H04N 21/2347* (2013.01); *H04N 21/44209* (2013.01); *H04N 21/466* (2013.01);
(Continued)

(58) Field of Classification Search
CPC .......................... H04N 21/4404; H04N 21/234
See application file for complete search history.

(56) References Cited

U.S. PATENT DOCUMENTS 8,706,655 B1 *  4/2014  Rangarajan ........ G06Q 30/0282
                                                     706/12
8,924,993 B1 * 12/2014  Niebles Duque .. G06K 9/00744
                                                      725/9

(Continued)

FOREIGN PATENT DOCUMENTS

WO    2015/144211 A1    10/2010
WO    2014/040646 A1     3/2014

OTHER PUBLICATIONS

European Search Report dated Oct. 11, 2017, on application No. EP 17 38 2523.

*Primary Examiner* — Mushfikh I Alam
(74) *Attorney, Agent, or Firm* — Lowenstein Sandler LLP (57) ABSTRACT

A method and respective system for determining quality of experience parameters of an encrypted video stream received at a client device is provided. The method comprises extracting, from one or more encrypted video streams sent over a network from a content server to a plurality of client devices, a first instance of at least one stream-related feature. A first instance of at least one quality-related label of a plurality of quality-related labels is determined based on applying a trained classifier to the first instance of the at least one stream-related feature, wherein each of the plurality of quality-related labels corresponds to a respective experience parameter of the quality of experience parameters of the encrypted video stream received at the client device.

20 Claims, 4 Drawing Sheets

(51) Int. Cl.

| | |
|---|---|
| *H04N 21/80* | (2011.01) |
| *H04N 21/44* | (2011.01) |
| *H04N 21/442* | (2011.01) |
| *H04N 21/6371* | (2011.01) |
| *G06K 9/62* | (2006.01) |
| *G06K 9/00* | (2006.01) |
| *H04N 21/6373* | (2011.01) |
| *H04L 29/06* | (2006.01) |
| *H04L 12/24* | (2006.01) |
| *H04N 21/647* | (2011.01) |
| *H04N 17/00* | (2006.01) |

(52) U.S. Cl.
CPC ..... *H04N 21/6371* (2013.01); *H04N 21/6373* (2013.01); *H04N 21/64723* (2013.01)

(56) References Cited

U.S. PATENT DOCUMENTS

| | | | | |
|---|---|---|---|---|
| 8,971,645 | B1* | 3/2015 | Ning | G06K 9/6296 |
| | | | | 382/103 |
| 9,280,742 | B1* | 3/2016 | Sargin | G06N 5/04 |
| 9,627,004 | B1* | 4/2017 | Varadarajan | G06F 40/169 |
| 9,659,218 | B1* | 5/2017 | Shetty | G06K 9/00744 |
| 9,961,169 | B1* | 5/2018 | Koster | H04L 69/18 |
| 10,381,022 | B1* | 8/2019 | Chaudhuri | G10L 17/04 |
| 10,474,717 | B2* | 11/2019 | Quennesson | H04N 21/8549 |
| 2002/0067857 | A1* | 6/2002 | Hartmann | G06F 16/5838 |
| | | | | 382/224 |
| 2013/0029708 | A1* | 1/2013 | Fox | H04W 40/24 |
| | | | | 455/509 |
| 2013/0091528 | A1* | 4/2013 | Honda | H04N 21/254 |
| | | | | 725/85 |
| 2013/0159498 | A1* | 6/2013 | Funge | H04L 65/80 |
| | | | | 709/224 |
| 2014/0240522 | A1* | 8/2014 | Lee | H04N 17/004 |
| | | | | 348/193 |
| 2014/0282769 | A1* | 9/2014 | Salem | H04L 67/322 |
| | | | | 725/94 |
| 2014/0363138 | A1* | 12/2014 | Coviello | G11B 27/28 |
| | | | | 386/241 |
| 2015/0138373 | A1* | 5/2015 | Garcia | H04N 19/89 |
| | | | | 348/192 |
| 2015/0296559 | A1* | 10/2015 | Liu | H04W 76/27 |
| | | | | 370/329 |
| 2015/0363060 | A1* | 12/2015 | Gaunt | H04N 21/44209 |
| | | | | 715/716 |
| 2016/0088322 | A1* | 3/2016 | Horev | H04N 21/23418 |
| | | | | 725/14 |
| 2016/0277952 | A1* | 9/2016 | Hui | H04W 24/08 |
| 2016/0294910 | A1* | 10/2016 | Li | H04N 21/2402 |
| 2017/0039452 | A1* | 2/2017 | Osindero | G06K 9/66 |
| 2017/0093648 | A1* | 3/2017 | ElArabawy | H04L 41/5067 |
| 2017/0094019 | A1* | 3/2017 | Ahmed | G06Q 50/01 |
| 2017/0265063 | A1* | 9/2017 | Xie | H04L 29/08 |
| 2017/0359309 | A1* | 12/2017 | Bolte | H04L 63/0218 |
| 2017/0359580 | A1* | 12/2017 | Su | H04N 19/179 |
| 2018/0007423 | A1* | 1/2018 | Tsukagoshi | H04N 19/30 |
| 2018/0013594 | A1* | 1/2018 | Mukkavilli | H04L 5/14 |
| 2018/0020243 | A1* | 1/2018 | Ni | H04N 21/2187 |
| 2018/0032845 | A1* | 2/2018 | Polak | G06K 9/6269 |
| 2018/0060653 | A1* | 3/2018 | Zhang | G06K 9/6215 |
| 2018/0268567 | A1* | 9/2018 | Hart | G06F 16/51 |
| 2018/0373962 | A1* | 12/2018 | Ye | G06K 9/00369 |
| 2019/0205805 | A1* | 7/2019 | Albino | H04M 3/2263 |
| 2019/0261053 | A1* | 8/2019 | Burkart | H04N 21/439 |
| 2019/0373464 | A1* | 12/2019 | Chari | H04L 41/12 |

* cited by examiner

DETERMINATION OF QOE IN ENCRYPTED VIDEO STREAMS USING SUPERVISED LEARNING

RELATED APPLICATIONS

This application claims the benefit under 35 U.S.C § 119(a) of European Patent Application No. 17 382 523.3, filed Jul. 31, 2017, which is incorporated by reference in its entirety.

TECHNICAL FIELD

The present disclosure relates to a method and a respective system to determine quality of experience parameters of an encrypted video stream to ascertain the impact of different enhancements performed on the underlying network in the video quality of experience, QoE, delivered to end users of that network. More particularly, the present disclosure relates to the use of supervised machine learning to determine quality of experience parameters of encrypted video streams.

BACKGROUND

Video is without doubt one of the top applications on both mobile and fixed networks, with end users accessing video content through content delivery technologies such as adaptive video streaming and over-the-top (OTT) video applications. Network providers may monitor network traffic in order to spot usage patterns, problems in delivery and where to improve the network, but this does not necessarily provide any information about how end-users are experiencing the network.

Video quality of experience provides a measure of how an end-user accessing video content is experiencing the network from a quality perspective. However, obtaining an accurate measure of QoE can be difficult. Feedback from an end user is subjective because each user's perception of video quality will not be the same. More objectively, the video quality of experience may be related to measurable QoE parameters, which, in principle, could be obtained from the video stream. However, almost all video streams are end-to-end encrypted for reasons of network security and user privacy, meaning that direct access to the video bitstream to estimate video quality is not possible.

Accordingly, video quality of experience may be ascertained in terms of QoE parameters measured at a client device, such as quality (low definition, standard definition, medium definition, high definition and ultra-high definition), resolution (width and height), rebuffering time, number of stalls, and time to stream start. However, the extraction of such information directly from client devices is difficult to implement and impacts on the processing power and bandwidth available to the client devices. In addition, the information obtained directly from client devices may not be easily linked to network conditions.

SUMMARY

In one embodiment of the present disclosure, a method for determining quality of experience parameters of an encrypted video stream received at a client device is provided. The method includes extracting, from one or more encrypted video streams sent over a network from a content server to a plurality of client devices, a first instance of at least one stream-related feature. A first instance of at least one quality-related label of a plurality of quality-related labels is determined based at least in part on applying a trained classifier to the first instance of the at least one stream-related feature, where each of the plurality of quality-related labels corresponds to a respective experience parameter of the quality of experience parameters of the encrypted video stream received at the client device. Accordingly, quality of experience parameters of an encrypted video stream received at a client device can be obtained from network traffic without having to extract information directly from the client device and without having to decrypt the video stream. Thus, determining QoE does not interfere with the operation of client devices and both network security and user privacy is maintained.

According to an aspect, the method further includes changing one or more parameters associated with the network and extracting, from the one or more encrypted video streams, a second instance of the at least one stream-related feature after changing the one or more parameters. A second instance of the at least one quality-related label is determined based on applying the trained classifier to the second instance of the at least one stream-related feature extracted after the changing of the one or more parameters. The first instance of the at least one quality-related label determined before the changing of the one or more parameters and the second instance of the at least one quality-related label determined after the changing of the one or more parameters are analyzed to obtain a measure of an impact of the changing of the one or more parameters on the quality of experience parameters of the encrypted video stream received at the client device. Accordingly, the impact of different enhancements performed on the underlying network on end-user quality of experience can be ascertained in a manner that is transparent to the user.

In another embodiment of the present disclosure, a method of obtaining a trained classifier for determining quality of experience parameters of an encrypted video stream received at a client device includes extracting, from one or more encrypted video streams sent over a network from a content server to a plurality of client devices, a set of stream-related features, extracting, from one or more client devices of the plurality of client devices, a set of quality-related labels corresponding to the quality of experience parameters of the encrypted video stream received at the one or more client devices, and training a classifier using a training dataset to obtain the trained classifier, where the training dataset includes the set of stream-related features and the set of quality-related labels. Thus, a link between traffic characteristics of the network that can be extracted from an encrypted video stream and video QoE is obtained, allowing the trained classifier to be applied to network traffic in order to provide a measure of video quality of experience at a client device without requiring access to the client device.

According to an aspect, the method further includes validating the trained classifier using a validation dataset and testing the trained classifier using a test dataset, where the validation dataset and the test dataset each include a respective set of stream-related features and a respective set of quality-related labels.

According to another aspect the one or more client devices include at least one of controlled user equipment (UEs) or UE simulators. Accordingly, a trained classifier may be trained on accurate data without having to access client devices directly. Further, the training, validation and testing of the classifier will be more efficient because controlled UEs and UE simulators will be configured to directly output the necessary quality data as quality-related labels.

According to an aspect, stream-related features include at least one of a volume timeline, a mean throughput, an effective throughput, a quartile of the throughput (such as a qt75 throughput, a qt25 throughput, a median throughput), a video state estimate, a video duration, at least one of a total number of high, mid, or low bitrate peaks, at least one of a high, mid, or low peak density, or a total number of the one or more encrypted video streams. Accordingly, QoE parameters may be determined based on features extracted from an end-to-end encrypted video stream. Thus, direct access to the bitstream is not required. This means that, there is no need for decryption of the video stream, which allows for user privacy and network security to be maintained.

According to an aspect, quality-related labels include one or more of video quality parameters, video resolution parameters, a rebuffering time, a rebuffering time percentage, a number of stalls, an average stall duration, a time to stream start, or a streaming reproduction cut-off ratio.

In an embodiment, one or more computer-readable storage media may have computer-readable instructions stored thereon, which, when executed by a processor, perform the method of the embodiments and aspects above.

In yet another embodiment, a system for determining quality of experience parameters of an encrypted video stream received at a client device includes a plurality of client devices configured to receive, from a content server, over a network, one or more encrypted video streams. The system further includes a classifier trained using a supervised machine learning algorithm, where the classifier is configured to be applied to at least one stream-related feature, extracted from the one or more encrypted video streams, to determine at least one quality-related label corresponding to the quality of experience parameters of the encrypted video stream received at the client device. Accordingly, the use of a classifier to obtain quality of experience parameters of an encrypted video stream received at a client device from the encrypted video stream directly means that the determination of video quality of experience is transparent to end users while maintaining network security and user privacy.

According to an aspect, during a training phase, the classifier is trained using a training data set including a set of stream-related features extracted from the one or more encrypted video streams and a set of quality-related labels received from one or more client devices of the plurality of client devices.

According to an aspect, during a validation phase and a test phase, the classifier is validated and tested using a validation dataset and a test dataset, respectively, where the validation dataset and the test dataset include a respective set of stream-related features extracted from the one or more encrypted video streams and a respective set of quality-related labels received from the one or more devices of the plurality of client devices. According to another aspect, during the training phase, validation phase and/or test phase, the one or more client devices include at least one of controlled UEs or UE simulators.

According to an aspect, the system further includes a feature extraction module configured to extract stream-related features from the one or more encrypted video streams.

BRIEF DESCRIPTION OF THE DRAWINGS

Various exemplary embodiments of the subject matter disclosed herein are illustrated in the accompanying drawings in which like reference numerals represent like parts throughout, in which.

DETAILED DESCRIPTION

Figure 1:
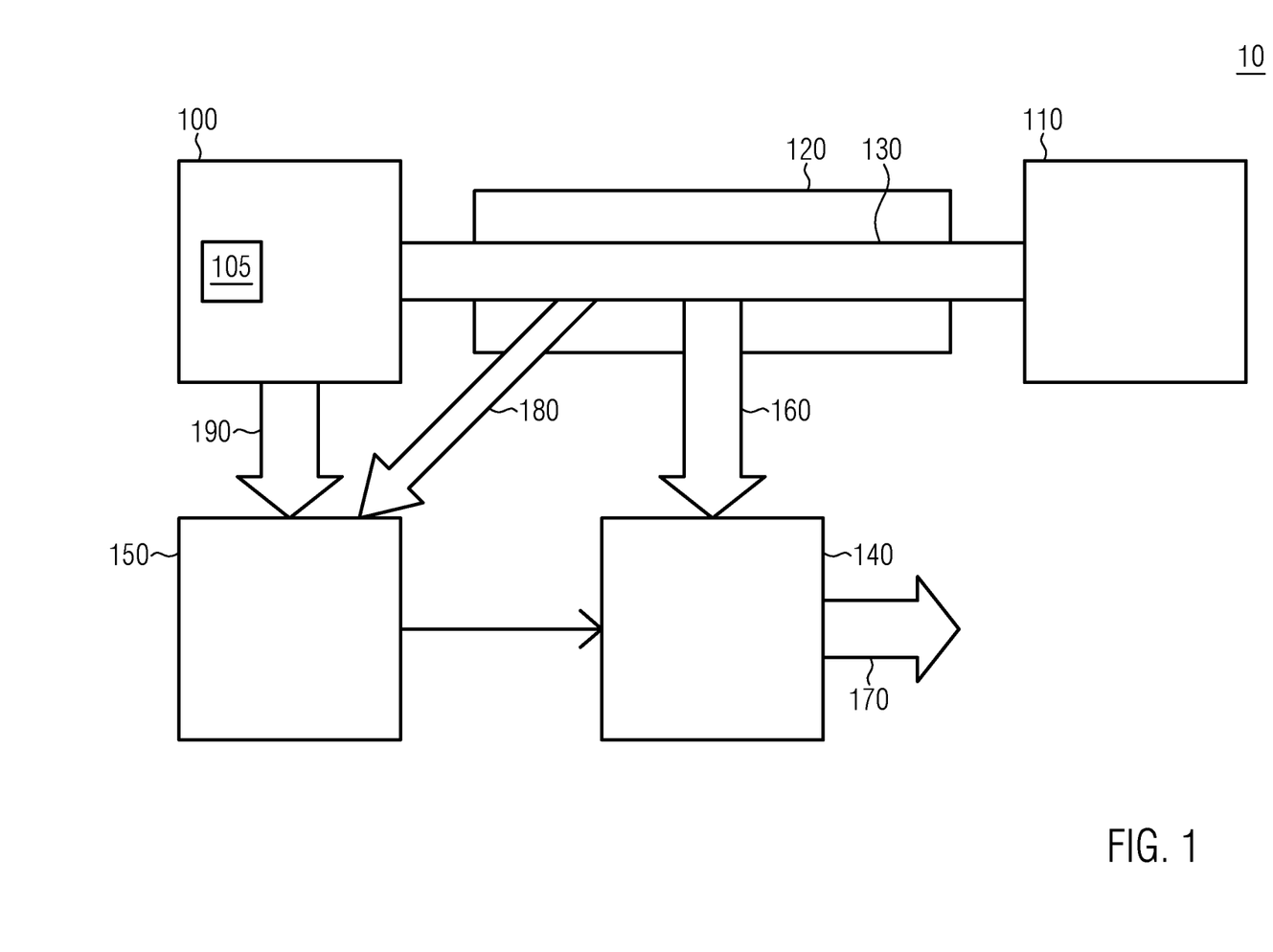
FIG. 1 illustrates a block diagram of a system for determining quality of experience parameters of an encrypted video stream received at a client device in accordance with certain embodiments.

FIG. 1 illustrates a schematic view of the overall structure of an exemplary system 10 for determining quality of experience parameters of an encrypted video stream received at a client device. The system includes a plurality of client devices 100, a content or media server 110, a network 120, an end-to-end encrypted video stream 130, a supervised machine learning algorithm 150, and a classifier 140.

The content or media server 110 hosts and serves video content accessed by end users through their respective client devices. The plurality of client devices 100 are configured to access video content provided by the content server 110 over the network 120, which may be a fixed or a mobile network. Specifically, the video content is provided to the client devices 100 by means of the end-to-end encrypted video stream 130. In some embodiments, the video stream 130 is not a single video stream, but includes one or more encrypted video streams. For example, video stream 130 may include a collection of packet streams which can run on a variety of transports, all of the transports being encrypted.

In supervised machine learning, a supervised machine learning algorithm analyzes training data consisting of training examples to produce an inferred function. Each training example is a pair consisting of an input and a corresponding known output, where the input is generally referred to as a feature and the corresponding output is generally referred to as a label. Both features and labels may be vectors. In the case where the output is discrete, the inferred function is referred to as a classifier. For any valid input (feature), a classifier should be able to predict the correct output (label). In other words, the classifier should be able to generalize from training examples to unseen data by classifying new features into labels.

Turning back to FIG. 1, the classifier 140, once trained, is configured to receive, as input, stream-related features 160 extracted from the video stream 130 and to output quality-related labels 170 corresponding to quality of experience parameters of an encrypted video stream received at a client device. In an embodiment, the classifier is trained using the supervised machine learning algorithm 150.

Any suitable supervised machine learning algorithm 150 to obtain a classifier 140 may be used, depending on, for example, the specific extracted stream-related features and the specific needs of the network provider, such as required accuracy and available training time. Examples of supervised machine learning algorithms are logistic regression, decision-tree based algorithms such as decision forest and decision jungle, neural network, support vector machine, Bayes point machine, etc.

In an embodiment, the classifier 140 is trained using a training dataset including a set of stream-related features 180 extracted from the one or more encrypted video streams 130 and a set of quality-related labels 190 extracted from one or more of the plurality of client devices 105. Alternatively, the quality-related labels may be received from the plurality of client devices 100. The supervised machine learning algorithm 150 is run on the training dataset to obtain the classifier 140.

In an embodiment, the set of stream-related features 180 received at the supervised machine learning algorithm 150 may be extracted from the one or more encrypted video streams 130 by a feature extraction module. The stream-related features are traffic-related characteristics inferred directly from the network traffic without any need for decrypting the encrypted video stream. In other words, stream-related features are chosen that do not require direct access to the bitstream. This means that stream-related features may be extracted without compromising network security or user privacy, and, further, without the need to install additional equipment in the network. For example, the feature extraction module may be a passive tap into the network 120.

In an embodiment, the stream-related features include at least one of a volume timeline, a mean throughput, an effective throughput, different quartiles of the throughput (such as a qt75 throughput, a qt25 throughput, and/or a median throughput), a video state estimate (transient, steady, silence, shortbuff), a video duration, a total number of high, mid and/or low bitrate peaks (peaks that cross given thresholds), a high, mid and/or low peak density, or a total number of the one or more encrypted video streams. The set of stream-related features 180 may be represented as feature vectors.

As discussed above, in some embodiments, the encrypted video stream is not a single video stream, but includes multiple encrypted video streams. In other words, multiple encrypted video streams may correspond to the same video content. Accordingly, the stream-related features may be extracted for the overall video content (i.e. all encrypted video streams corresponding to the same video content), the different video states (for example, throughput during the transient state, throughput during the steady state, throughput during the silence state, throughput during the shortbuff state, duration of the transient state, duration of the steady state, and so on for each of the stream-related features), and for the one or more encrypted video streams that compose the video content.

In addition, the stream-related features may include information received from the network, such as information associated with the signaling plane. For example, the stream-related features may include a device type of the client device receiving the encrypted video stream.

The quality-related labels 190 directly correspond to quality of experience parameters. In an embodiment, the quality-related labels 190 include at least one of quality (e.g., low definition, standard definition, medium definition, high definition and ultra-high definition), resolution (e.g., 256×144, 426×240, 1280×720, 1920×1080, etc.), rebuffering time, rebuffering time percentage, number of stalls, average stall duration, time to stream start in time units, or streaming reproduction cut-off ratio. The set of quality-related labels 190 may be labeled vectors of features. The set of quality-related labels may be ground truth labels corresponding to features directly measured at the plurality of client devices.

In an embodiment, the one or more client devices 105 of the plurality of client devices 100 from which the quality-related labels 190 are extracted are controlled UEs and UE simulators. Accordingly, the features directly measured at the client devices to obtain the quality-related labels may be directly output in the appropriate format as labeled vectors of features. This improves efficiency by eliminating the need to process raw data into valid (correctly-formatted) labels for input into the supervised machine learning algorithm.

In supervised machine learning, once the inferred function (for example, the classifier) has achieved the desired level of accuracy on the training dataset, the classifier is validated and tested. Specifically, validation is used to tune the parameters of the classifier and testing is used to assess the performance of the trained classifier.

The classifier 140 may be tested and validated using a test dataset and a validation dataset, respectively. The test dataset and the validation dataset each include a set of quality-related labels extracted from the plurality of client devices and a set of stream-related features extracted from the one or more encrypted video streams. In some embodiments, the test dataset and the validation dataset are obtained in the same manner as described above in relation to the training dataset. The training, test, and validation datasets include different sets of quality-related labels and stream-related features.

The trained classifier 140 is then run on an application dataset including stream-related features extracted from network traffic in order to classify the stream-related features into quality-related labels. In an embodiment, at least one stream-related feature 160 is extracted from the one or more encrypted video streams 130 received at the plurality of client devices 100. The trained classifier 140 is applied to the at least one stream-related feature 160 to obtain at least one of quality-related label 170, which represents the video quality of experience that end users have when processing the network traffic in their client devices (e.g., user equipment) 100. From these labels, QoE parameters such as video resolution, video quality, video stalls and video rebuffering can be obtained.

Accordingly, the quality of experience of an end user viewing content using a client device receiving an encrypted video stream is ascertained without the need to obtain data directly from the receiving client device and without the need to decrypt the video stream or the need for knowledge of the content server.

Figure 2:
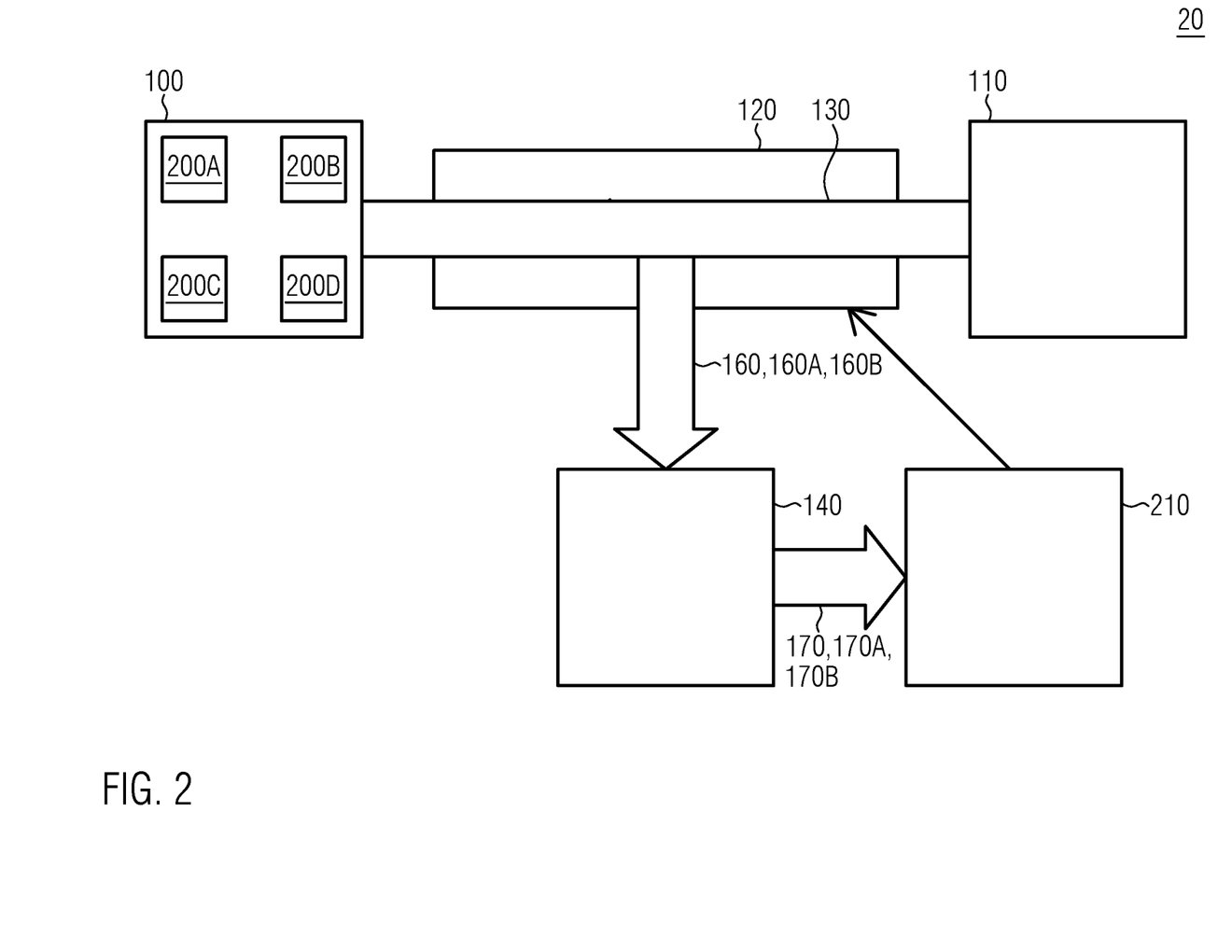
FIG. 2 illustrates a block diagram of a system for determining the impact of changing network parameters on quality of experience parameters of an encrypted video stream received at a client device in accordance with certain embodiments.

FIG. 2 illustrates a schematic view of an exemplary system 20 in which the trained classifier 140 of FIG. 1 may be used to ascertain the impact of different enhancements performed to the underlying network on the video quality of experience delivered to end users of that network. The system includes the plurality of client devices 100, the content server 110, the network 120, the end-to-end encrypted video stream 130 and the classifier 140 as described above in relation to FIG. 1. In addition, the system of FIG. 2 includes a network operator 210.

As described in relation to FIG. 1, the classifier 140 is configured to receive stream-related features 160 extracted from the one or more encrypted video streams 130 by a feature extraction module, such as a passive tap into the network 120. The classifier 140 is then applied to the extracted stream-related features 160 to obtain quality-related labels 170 that correspond to quality of experience parameters. As illustrated in FIG. 2, the quality-related labels 170 and/or quality of experience parameters are provided to the network operator 210. The network operator 210 may then analyze the quality-related labels 170 and/or quality of experience parameters to assess how changes to the network affect the end user's video quality of experience as will be described in more detail below.

In an embodiment, the network operator 210 changes one or more parameters associated with the network. For example, the network operator 210 may perform capacity enhancements at the radio access or core network, optimization enhancements etc. A pre-post analysis of the same quality-related labels can then be used to measure the impact of the changes on video quality of experience.

In an embodiment, the classifier 140 is applied to at least one stream-related feature 160A to obtain at least one quality-related label 170A. Subsequently, one or more parameters associated with the network are changed and at least one stream-related feature 160B is extracted after changing the one or more parameters to obtain, using the classifier 140, at least one quality-related label 170B. The first and second instances of at least one quality-related label 170A and 170B, respectively obtained before and after changing the one or more network parameters, are then analyzed to obtain a measure of an impact of changing the one or more parameters on quality of experience.

FIG. 2 also illustrates that the plurality of client devices 100 may be divided into subsets of client devices to enable A/B testing of network parameter changes. The plurality of client devices may be divided into subsets of client devices based on one or more of location, type of device, content or media provider, type of subscription, etc. For illustration purposes, the plurality of client devices 100 includes four subsets of client devices 200A, 200B, 200C, and 200D. However, the plurality of client devices may be divided into any number of subsets of client devices.

In an example, a network parameter affecting content delivery over the network 120 to the subset of client devices 200A may be changed, while the network parameter for the subset of client devices 200B to 200D remains unchanged. The at least one stream-related feature 160 is extracted from the one or more video streams 130 before and after the network parameter change and run through the classifier 140 to obtain the corresponding at least one quality-related label 170. As described above, analysis of the at least one quality-related label determined before and after the change in the network parameter allows the network operator 210 to assess the impact of the network parameter change affecting one subset of client devices on the quality of experience for all client devices.

This provides a means for a network provider to test enhancements and optimizations performed on the underlying network while being able to ensure that the experience of end-users is not affected. Additionally, a network provider may be able test changes to the network on a small subset of customers and use the information regarding the impact of the network parameter change to predict the impact on other subsets of customers.

Figure 3:
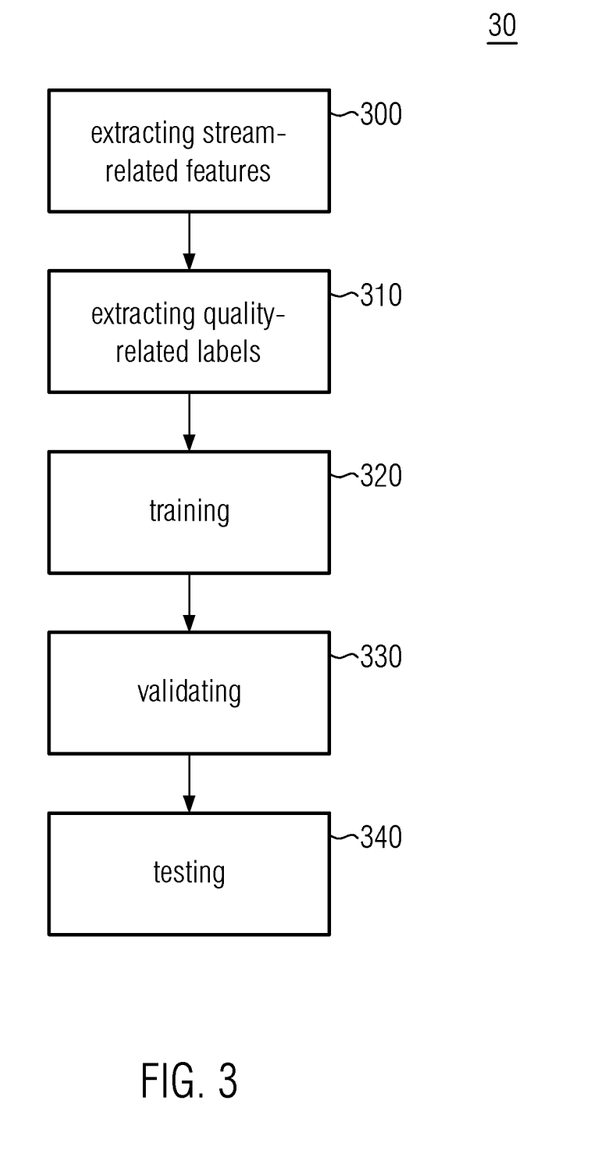
FIG. 3 illustrates a process flow diagram for a method of obtaining a trained classifier for determining quality of experience parameters for an encrypted video stream received at a client device in accordance with certain embodiments.

FIG. 3 is a block diagram of an exemplary method 30 of obtaining a trained classifier 140 for determining quality of experience parameters for an encrypted video stream received at a client device in accordance with an embodiment. The method may be implemented by one or more of the systems described above in relation to FIGS. 1 and 2.

At block 300, a set of stream-related features 180 is extracted from the one or more encrypted video streams 130 sent over the network 120 from a content server 110 to a plurality of client devices 100. In an embodiment, the stream-related features 180 are extracted from the one or more encrypted video streams 130 by a feature extraction module. The set of stream-related features 180 may be represented as feature vectors.

In an example, the feature extraction module may be a passive tap into the network 120. In an embodiment, the stream-related features may include at least one of a volume timeline, a mean throughput, an effective throughput, different quartiles of the throughput (such as a qt75 throughput, a qt25 throughput and/or a median throughput), a video state estimate (transient, steady, silence, shortbuff), a video duration, a total number of high, mid and/or low bitrate peaks (peaks that cross given thresholds), a high, mid and/or low peak density, or a total number of the one or more encrypted video streams. As discussed above, the stream-related features may be extracted for the overall video content, each of the different video states, and for the one or more encrypted video streams that constitute the video content.

In addition, the stream-related features may include information received from the network, such as information based on the signaling plane. For example, the stream-related features may include a device type of the client device receiving the encrypted video stream.

The set of stream-related features 180 may be represented as feature vectors.

At block 310, a set of quality-related labels 190 are extracted from one or more client devices 105 of the plurality of client devices 100. The set of quality-related labels 190 correspond to quality of experience parameters of an encrypted video stream received at a client device. The quality-related labels 190 directly correspond to the quality of experience parameters. In an embodiment, the quality-related labels 190 include one or more of quality (low definition, standard definition, medium definition, high definition and ultra-high definition), resolution (256×144, 426× 240, 1280×720, 1920×1080, etc.), rebuffering time, rebuffering time percentage, number of stalls, average stall duration, time to stream start in time units, or streaming reproduction cut-off ratio. The quality-related labels 190 may be ground truth labels corresponding to quality-related parameters directly measured at a client device. The one or more client devices 105 from which quality-related labels are extracted may be controlled UEs and/or UE simulators.

At block 320, in a training phase, a classifier 140 is trained using a training dataset to obtain a trained classifier, where the training dataset includes the set of stream-related features 180 and the set of quality-related labels 190. The one or more stream-related features 180 and the one or more quality-related labels 190 are provided as input into the supervised machine learning algorithm 150 to train the classifier 140.

At blocks 330 and 340, the trained classifier 140 is validated and tested in a validation phase and a testing phase, respectively, as described above in relation to FIG. 1. In an embodiment, the test dataset used in the testing phase and the validation dataset used in the validation phase each include a set of quality-related labels extracted from the plurality of client devices and a set of stream-related features extracted from the one or more encrypted video streams.

As will be described in more detail in relation to FIG. 4 below, once the classifier 140 has been trained in block 320, and optionally validated and tested in blocks 330 and 340, the classifier 140 may be run on an application dataset including stream-related features 160, extracted from network traffic, in order to classify the stream-related features 160 into quality-related labels 170. The quality-related labels 170 correspond to quality of experience parameters of an encrypted video stream at a client device. Accordingly, based on the determined quality-related labels 170, quality of experience parameters and therefore quality of experience may be obtained.

Figure 4:
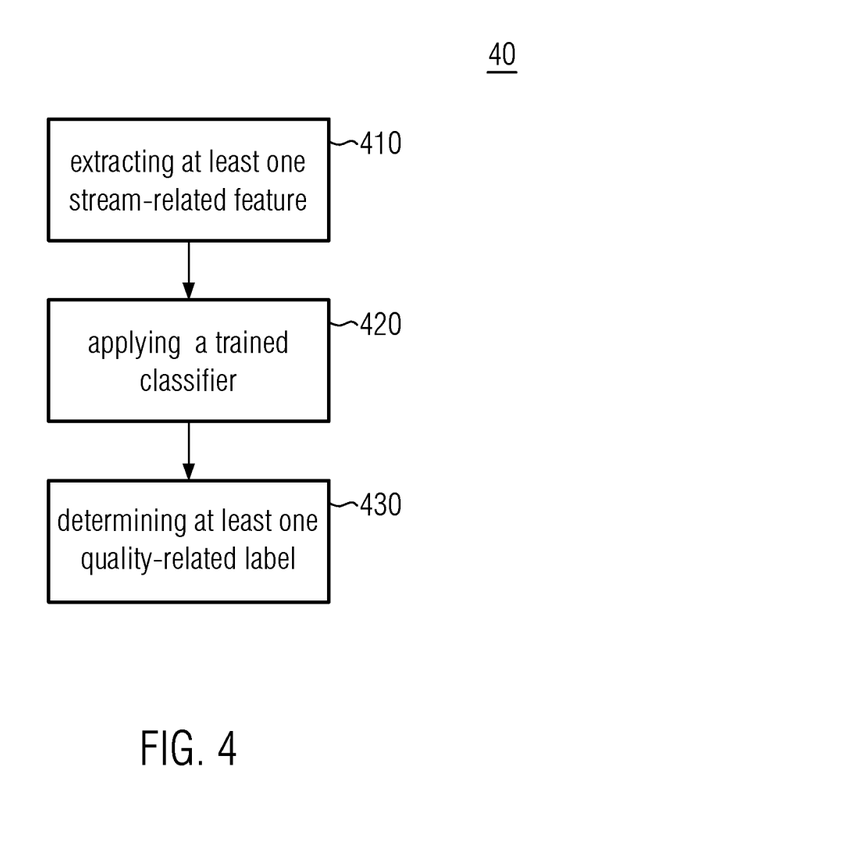
FIG. 4 illustrates a process flow diagram for a method for determining quality of experience parameters of an encrypted video stream received at a client device in accordance with certain embodiments.

FIG. 4 is a block diagram illustrating an exemplary method for determining quality of experience parameters of an encrypted video stream received at a client device in accordance with an embodiment.

At block 410 at least one stream-related feature 160 is extracted from the one or more encrypted video streams 130 sent over a network 120 from a content server 110 to a plurality of client devices 100. As described above in relation to FIGS. 1 to 3, in an embodiment, the at least one stream-related feature 160 is extracted from the one or more encrypted video streams 130 by a feature extraction module. In an example, the feature extraction module may be a passive tap into the network 120. In an embodiment, the at least one stream-related feature 160 includes at least one of a volume timeline, a mean throughput, an effective throughput, different quartiles of the throughput (such as a qt75 throughput, a qt25 throughput, and/or a median throughput), a video state estimate (transient, steady, silence, shortbuff), a video duration, a total number of high, mid and/or low bitrate peaks (peaks that cross given thresholds), a high, mid and/or low peak density, or a total number of the one or more encrypted video streams. As discussed above, the stream-related features may be extracted for the overall video content, each of the different video states, and for the one or more encrypted video streams that compose the video content. In addition, the stream-related features may include information received from the network, for example, a device type of the client device receiving the encrypted video stream.

At block 420, the classifier 140 is applied to the extracted at least one stream-related feature 160. Based at least in part on block 420, at least one quality-related label 170 is determined at block 430, where quality-related labels correspond to quality of experience parameters of an encrypted video stream received at a client device.

As described above in relation to FIG. 2, the method of determining quality-related labels can be used to assess the impact of network changes on video quality of experience. Specifically, blocks 410 to 430 may be repeated after a change in one or more parameters to the network 120 and the quality-related labels obtained before and after the change analyzed in order to measure the impact of the change on video quality of experience.

The methods described in relation to FIGS. 3 and 4 may be implemented by any suitable computer-implemented means. In an embodiment, one or more computer-readable storage media may have computer-readable instructions stored thereon, which, when executed by a processor, perform the operations illustrated in FIGS. 3 and 4.

It is to be understood that the above description is intended to be illustrative, and not restrictive. Many other embodiments will be apparent upon reading and understanding the above description. Although embodiments of the present disclosure have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method for determining quality of experience parameters of an encrypted video stream received at a client device, the method comprising:

extracting, from one or more encrypted video streams sent over a network from a content server to a plurality of client devices, a first instance of at least one stream-related feature associated with at least one of throughput of the one or more encrypted video streams, peak density of the one or more encrypted video streams, or quantity of the one or more encrypted video streams;

determining a first instance of at least one quality-related label of a plurality of quality-related labels based on applying a trained classifier to the first instance of the at least one stream-related feature extracted from the one or more encrypted video streams, the trained classifier being trained based on a training dataset, validated based on a validation dataset, and tested based on a test dataset, wherein each of the plurality of quality-related labels corresponds to a respective quality of experience parameter of the quality of experience parameters of the encrypted video stream received at the client device, and wherein the at least one quality-related label is associated with playback quality of the one or more encrypted video streams;

changing one or more first network parameters associated with the network to perform capacity enhancements at a radio access network used to connect the content server to a first subset of the plurality of client devices via the network or at a network core used to connect the content server to the first subset of the plurality of client devices via the network;

extracting, from the one or more encrypted video streams sent from the content server to the first subset of the plurality of client devices, a second instance of the at least one stream-related feature after the changing of the one or more first network parameters;

determining a second instance of the at least one quality-related label based on applying the trained classifier to the second instance of the at least one stream-related feature extracted after the changing of the one or more first network parameters;

analyzing the first instance of the at least one quality-related label determined before the changing of the one or more first network parameters and the second instance of the at least one quality-related label determined after the changing of the one or more first network parameters to determine a measurement of an impact of the changing of the one or more first network parameters on the quality of experience parameters of the encrypted video stream received at the first subset of the plurality of client devices; and changing one or more second network parameters associated with the network used to connect the content server to a second subset of the plurality of client devices in view of the measurement of the impact of the changing of the one or more first network parameters on the quality of experience parameters of the encrypted video stream received at the first subset of the plurality of client devices, wherein the second subset is different from the first subset.

2. The method of claim 1 further comprising:

extracting, from the one or more encrypted video streams sent over the network from the content server to the plurality of client devices, a set of stream-related features;

extracting, from one or more client devices of the plurality of client devices, a set of quality-related labels corresponding to the quality of experience parameters of the encrypted video stream received at the one or more client devices; and training a classifier using the training dataset to obtain the trained classifier, wherein the training dataset comprises the set of stream-related features and the set of quality-related labels.

3. The method of claim 2, further comprising:
validating the trained classifier using the validation dataset; and
testing the trained classifier using the test dataset, wherein the validation dataset and the test dataset each comprise a respective set of stream-related features and a respective set of quality-related labels.

4. The method of claim 2, wherein the one or more client devices comprise at least one of controlled user equipment (UEs) or UE simulators.

5. The method of claim 1, wherein the at least one stream-related feature comprises at least one of:
an effective throughput;
a quartile of throughput;
at least one of a high, mid, or low peak density; or
a total number of the one or more encrypted video streams.

6. The method of claim 5, wherein the at least one quality-related label comprises one or more of a rebuffering time percentage, or a streaming reproduction cut-off ratio.

7. A system for determining quality of experience parameters of an encrypted video stream received at a client device, the system comprising:
a plurality of client devices configured to receive over a network from a content server, one or more encrypted video streams;
a classifier trained using a supervised machine learning algorithm and a training data set, validated based on a validation dataset, and tested based on a test dataset, wherein the classifier is configured to be applied to at least one stream-related feature, extracted from the one or more encrypted video streams without obtaining data directly from the client device and without decrypting the one or more encrypted video streams, to determine at least one quality-related label corresponding to the quality of experience parameters of the encrypted video stream of the one or more encrypted video streams received at the client device, wherein the at least one stream-related feature is extracted from the one or more encrypted video streams via a passive tap into the network, wherein the at least one stream-related feature is associated with at least one of throughput of the one or more encrypted video streams, peak density of the one or more encrypted video streams, or quantity of the one or more encrypted video streams, and wherein the at least one quality-related label is associated with playback quality of the one or more encrypted video streams; and
a network operator component configured to:
receive the at least one quality-related label from the classifier;
change one or more first network parameters associated with the network to perform capacity enhancements at a radio access network used to connect the content server to a first subset of the plurality of client devices via the network or at a network core used to connect the content server to the first subset of the plurality of client devices via the network;
analyze the at least one quality-related label determined before and after changing the one or more first network parameters to determine a measurement of an impact of changing the one or more first network parameters on the quality of experience parameters of the encrypted video stream received at the first subset of the plurality of client devices; and
change one or more second network parameters associated with the network used to connect the content server to a second subset of the plurality of client devices in view of the measurement of the impact of changing the one or more first network parameters on the quality of experience parameters of the encrypted video stream received at the first subset of the plurality of client devices, wherein the second subset is different from the first subset.

8. The system of claim 7, wherein the classifier is trained using the training data set comprising a set of stream-related features extracted from the one or more encrypted video streams and a set of quality-related labels received from one or more client devices of the plurality of client devices.

9. The system of claim 8, wherein the one or more client devices comprise at least one of controlled user equipment (UEs) or UE simulators.

10. The system of claim 8, wherein the set of stream-related features comprise at least one of:
an effective throughput;
a quartile of throughput; or
at least one of a high, mid, or low peak density; or a total number of the one or more encrypted video streams.

11. The system of claim 8, wherein the set of quality-related labels comprises one or more of a rebuffering time percentage, or a streaming reproduction cut-off ratio.

12. The system of claim 7, further comprising a feature extraction module comprising the passive tap that is configured to extract the at least one stream-related feature from the one or more encrypted video streams.

13. One or more computer-readable storage media having computer-readable instructions stored thereon, which, when executed by a processor, perform operations comprising:
extracting, from one or more encrypted video streams sent over a network from a content server to a plurality of client devices, a first instance of at least one stream-related feature associated with at least one of throughput of the one or more encrypted video streams, peak density of the one or more encrypted video streams, or quantity of the one or more encrypted video streams without obtaining data directly from the plurality of client devices and without decrypting the one or more encrypted video streams, wherein the extracting of the first instance of the at least one stream-related feature is via a passive tap into the network;
determining a first instance of at least one quality-related label of a plurality of quality-related labels based on applying a trained classifier to the first instance of the at least one stream-related feature extracted from the one or more encrypted video streams, the trained classifier being trained based on a training dataset, validated based on a validation dataset, and tested based on a test dataset, wherein each of the plurality of quality-related labels corresponds to a respective quality of experience parameter of quality of experience parameters of an encrypted video stream received at a client device, and wherein the at least one quality-related label is associated with playback quality of the one or more encrypted video streams;

changing one or more first network parameters associated with the network to perform capacity enhancements at a radio access network used to connect the content server to a first subset of the plurality of client devices via the network or at a network core used to connect the content server to the first subset of the plurality of client devices via the network;

extracting, from the one or more encrypted video streams sent from the content server to the first subset of the plurality of client devices, a second instance of the at least one stream-related feature after the changing of the one or more first network parameters;

determining a second instance of the at least one quality-related label based on applying the trained classifier to the second instance of the at least one stream-related feature extracted after the changing of the one or more first network parameters;

analyzing the first instance the at least one quality-related label determined before the changing of the one or more first network parameters and the second instance of the at least one quality-related label determined after the changing of the one or more first network parameters to determine a measurement of an impact of the changing of the one or more first network parameters on the quality of experience parameters of the encrypted video stream received at the first subset of the plurality of client devices; and changing one or more second network parameters associated with the network used to connect the content server to a second subset of the plurality of client devices in view of the measurement of the impact of the changing of the one or more first network parameters on the quality of experience parameters of the encrypted video stream received at the first subset of the plurality of client devices, wherein the second subset is different from the first subset.

14. The one or more computer-readable storage media of claim 13, wherein the operations further comprise:

extracting, from the one or more encrypted video streams sent over the network from the content server to the plurality of client devices, a set of stream-related features;

extracting, from one or more client devices of the plurality of client devices, a set of quality-related labels corresponding to the quality of experience parameters of the encrypted video stream received at the one or more client devices; and training a classifier using the training dataset to obtain the trained classifier, wherein the training dataset comprises the set of stream-related features and the set of quality-related labels.

15. The one or more computer-readable storage media of claim 14, wherein the operations further comprise:

validating the trained classifier using the validation dataset; and testing the trained classifier using the test dataset, wherein the validation dataset and the test dataset each comprise a respective set of stream-related features and a respective set of quality-related labels.

16. The one or more computer-readable storage media of claim 14, wherein the one or more client devices comprise at least one of controlled user equipment (UEs) or UE simulators.

17. The one or more computer-readable storage media of claim 14, wherein:

the set of stream-related features comprises at least one of:
  an effective throughput;
  a quartile of throughput;
  a high, mid and/or low peak density; or
  a total number of the one or more encrypted video streams; and the set of quality-related labels comprise at least one of:
  a rebuffering time percentage;
  or
  a streaming reproduction cut-off ratio.

18. The method of claim 1, wherein:

the extracting of the first instance of the at least one stream-related feature is without obtaining data directly from the client device and without decrypting the one or more encrypted video streams; and the extracting of the first instance of the at least one stream-related feature is via a passive tap into the network.

19. The method of claim 18, wherein:

the extracting of the second instance of the at least one stream-related feature is without obtaining data directly from the client device and without decrypting the one or more encrypted video streams; and the extracting of the second instance of the at least one stream-related feature is via the passive tap into the network.

20. The method of claim 1, wherein the measurement of the impact is a metric associated with a difference between the first instance of the at least one quality-related label and the second instance of the at least one quality-related label.

* * * * *